March 18, 1941. R. B. FANNIN 2,235,424
LIQUEFIED GAS TANK
Filed April 15, 1939
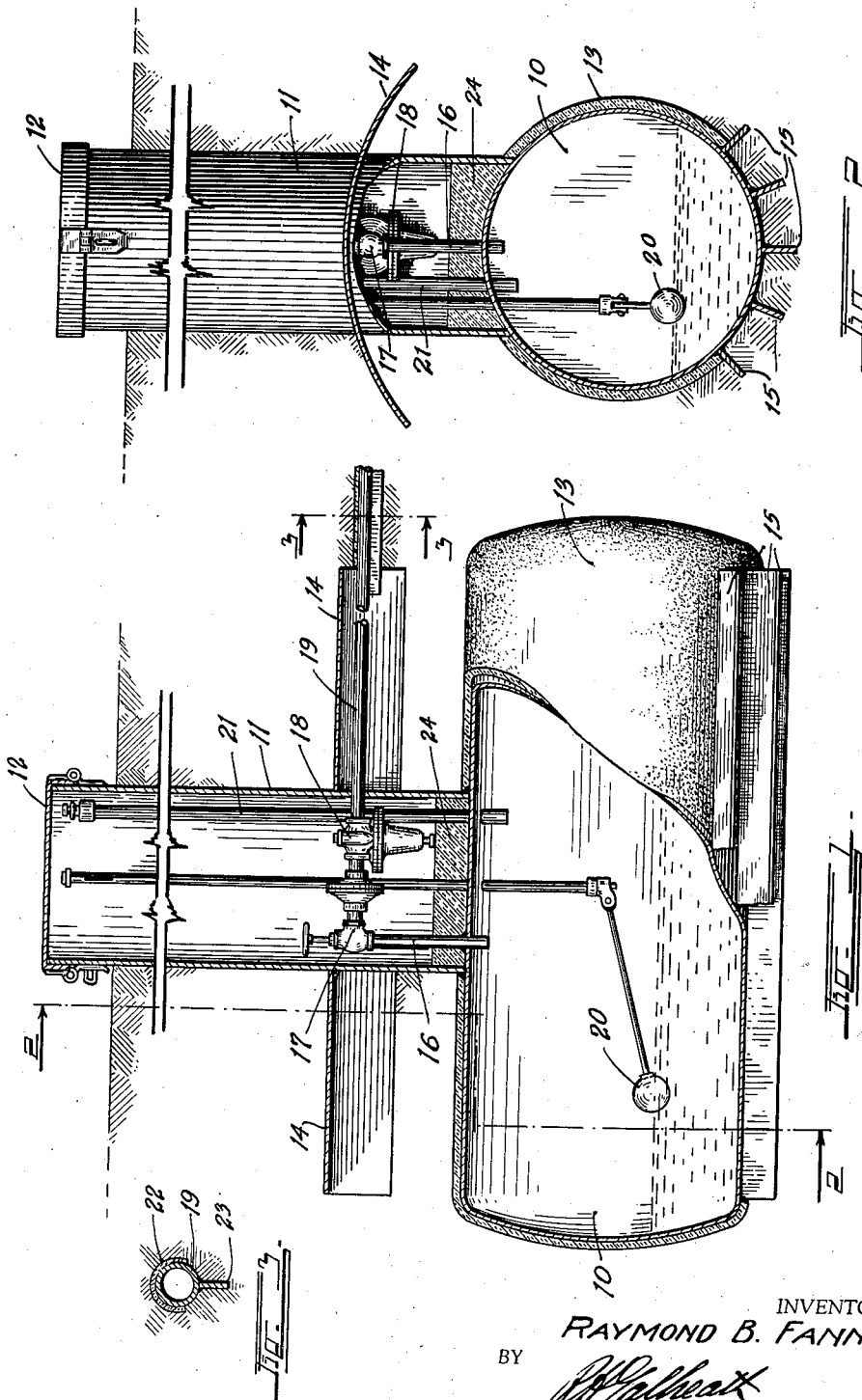
INVENTOR.
RAYMOND B. FANNIN
BY
ATTORNEY.

Patented Mar. 18, 1941

2,235,424

UNITED STATES PATENT OFFICE 2,235,424

LIQUEFIED GAS TANK

Raymond B. Fannin, Denver, Colo.

Application April 15, 1939, Serial No. 268,043

2 Claims. (Cl. 62—1)

This invention relates to a tank for storing liquefied gas and more particularly to a consumer's storage tank for furnishing gas for household use. Such a tank is installed at the consumer's premises and is filled at regular intervals with liquefied gas of low volatility, such as butane, methane, etc., from a delivery tank truck.

Ordinarily, agitating and gasifying devices, such as circulating water, etc. are employed to raise the temperature of the liquefied gas to convert it to the gaseous state.

The principal object of this invention is to provide a self-agitating or self-gasifying tank which will concentrate the natural earth's heat at the bottom of the storage tank to cause gas bubbles to form at the bottom and rise through the liquid body to create agitation and gasification therein without the use of circulating water or other heat exchange devices.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved self-agitating, liquefied gas tank, partially broken away to show the inner construction thereof.

Fig. 2 is a vertical section, taken on the line 2—2, Fig. 1.

Fig. 3 is a detail cross section through the service main, taken on the line 3—3, Fig. 1.

The invention consists of a storage tank 10 preferably, but not necessarily, cylindrical. Extending upwardly from the tank 10 is a service riser 11 terminating at its top in any suitable cap 12. The bottom of the riser is closed by heat insulating material 24. The tank is designed to be buried below the surface of the earth with the service riser exposed above the surface thereof. The tank is provided with the usual gas outlet pipe 16, control valve 17, pressure reducing valve 18, service main 19, gauge float 20, and filling pipe 21.

Transference of heat through the upper portion of the tank would interfere with the agitation of the liquid therein since it would tend to equalize temperatures throughout the entire tank. To prevent this, the tank is covered with suitable heat insulation 13 which extends downwardly around the sides thereof. The insulation, however, is omitted from the bottom portion of the tank. The upper portion of the tank is still further insulated by means of a heat shield 14 which is supported by the riser 11 over the top of the tank.

The transference of heat through the bottom of the tank is facilitated by means of a series of metallic fins 15 secured to, and extending outwardly into the earth from the uninsulated bottom of the tank.

It can be readily seen that the upper portion of the tank will remain relatively cold and that the natural heat from the ground will be concentrated on the bottom of the tank by means of the fins 15 and the uninsulated metal of the bottom. This will heat the lower portion of the gas, causing gas bubbles to form along the bottom. These bubbles will rise through the liquefied gas creating a boiling and foaming effect which serves to bring the relatively warm bubbles into intimate dispersed contact with the cold liquid to raise the temperature thereof to the gas producing stage. The gas is released at reduced pressure by the pressure reducing valve 18 and carried through the service main 19 to the consumer's appliances.

In installations where a cold winter surface temperature is encountered, there may be a tendency for the gas to condense in the service main. To prevent this, the service main, or a portion thereof, is constructed similarly to the tank. That is, the upper portion of the pipe is covered with heat insulation 22 and the lower portion thereof is provided with one or more longitudinally extending heat absorbing fins 23. The action of this portion of the service main is similar to the tank, that is, the heat will be concentrated on the bottom of the pipe causing any condensed gas therein to be automatically regasified.

The shield 14 first prevents earth from packing on top of the tank when the excavation is filled, so as to preserve an insulating air space thereover. It also serves to prevent surface water from reaching the earth over the tank so that the latter will not be packed or frozen in winter. This dry loose earth in an air pocket serves as an ideal insulator.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A liquefied gas plant comprising: a closed tank buried in the ground; fins secured to and projecting from the bottom of said tank into the ground to concentrate the heat transference at the bottom of said tank; and means for conducting gas from said tank.

2. A liquefied gas plant comprising: a closed tank buried in the ground; fins secured to and projecting from the bottom of said tank into the ground to concentrate the heat transference at the bottom of said tank; means for conducting gas from said tank; and heat insulation about said tank covering the upper portions of the surface thereof, the bottom of said tank being insulated and in direct contact with the earth.

RAYMOND B. FANNIN.